Figure 1:
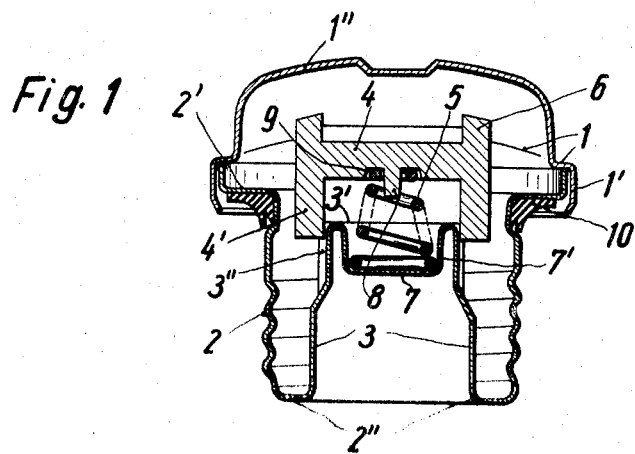

United States Patent [19]

Blau et al.

[11] 3,843,015
[45] Oct. 22, 1974

[54] SCREW CAP FOR CONTAINERS

[75] Inventors: Werner Blau; Theo Gerdes, both of Langenfeld/Rheinland, Germany

[73] Assignee: Blau KG Fabrik Fuer Kraftfahrzeugteile, Langenfeld, Germany

[22] Filed: Jan. 26, 1973

[21] Appl. No.: 327,096

[30] Foreign Application Priority Data
Jan. 28, 1972 Germany............................ 2204088

[52] U.S. Cl................220/288, 215/329, 220/304, 220/200, 215/200
[51] Int. Cl............................................. B65d 41/04
[58] Field of Search........ 220/39 R, 40 S; 215/43 R, 215/49, 50, 55

[56] References Cited
UNITED STATES PATENTS
2,613,012  10/1952  Taylor et al...................... 220/39 R
3,023,924  3/1962  Boyer............................. 220/39 R Primary Examiner—John Petrakes
Attorney, Agent, or Firm—Ernest G. Montague; Karl F. Ross; Herbert Dubno

[57] ABSTRACT

A screw cap for containers, comprising a cap part and a threaded part, said cap part being mounted on and rotatable with respect to said threaded part, said cap part having a pressed-out hand grip arranged thereacross, means for coupling together said cap part and said threaded part comprising a bridge part, bearing limbs provided on said bridge part and spring means biasing said bridge part, said threaded part including grooves therein for guiding said bearing limbs, said spring means being located between said bridge part and said threaded part and urging said bridge part against said cap part and acting in such a manner that, on reaching a predetermined tightening torque of said threaded part in a thread, automatic decoupling of said parts occurs thereby preventing excessive tightening of said threaded part.

5 Claims, 2 Drawing Figures

SCREW CAP FOR CONTAINERS

The invention relates to a screw cap for containers or for closing pipe sockets, comprising a threaded cap part on which a twist-cap part is mounted, and a coupling connecting both parts mounted such that in the closing direction the cap may not be tightened beyond a predetermined torque thus preventing the cap from being excessively tightened. When the cap has been tightened to the predetermined amount both cap parts are automatically disconnected, whilst to open the cap by rotating it in an opposite direction the coupling reconnects the cap parts, and the cap may easily be reopened.

It is an object of the invention to provide a simplification in the guidance or mounting of coupling parts of a known kind with a compression spring for gauging the required thread tightening torque and automatically disengaging the upper and lower parts of the cap, more especially for cap parts made of metallic materials.

In accordance with the present invention a screw cap for containers or pipe-socket closures comprises a cap mounted on and rotatable with respect to a threaded part, said cap having a pressed-out hand grip across it, the cap and the threaded part being coupled by a bridge part biased by a spring and acting in such a manner that on reaching a predetermined tightening torque of the threaded part in a thread, there is automatic decoupling of the said parts to prevent excessive tightening of the threaded part, in which the threaded part has grooves therein in which bearing limbs of said bridge part may be guided; and a spring is located between said bridge part and said threaded part, said spring urging said bridge part against said cap.

Figure 2:
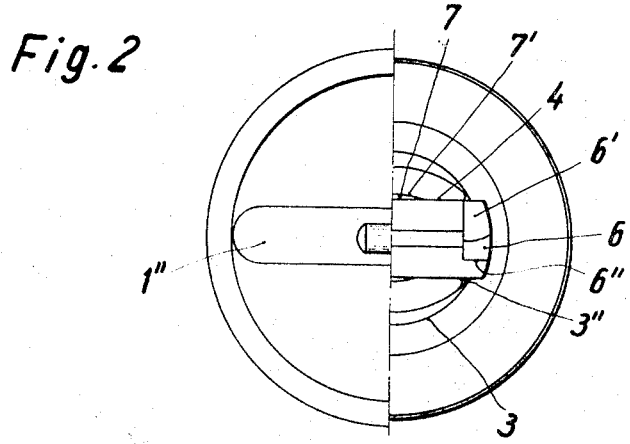

The invention will be described further with reference to the accompanying drawings, in which:

FIG. 1 is a medial section through the cap, and
FIG. 2 is a plan view of the cap- partly in section.

FIGS. 1 and 2 show a cap having a cap part 1, with overlapping rim 1' rotatably mounted on a threaded cap part 2 having a flange edge 2' located within the rim 1'. The threaded cap part 2 has a cavity in the form of a retroverted cup extending from an edge 2" inside the threaded portion, having a tubular wall 3 with said wall converging to form a closure 3'. A bridge part 4 having bearing limbs 4' is mounted between cap parts 1 and 2, on the retroverted cup part 3, 3' with a compression spring 5, interposed between the bridge part 4 and the closure 3', whereby the bearing limbs 4' are guided in diametrically opposite grooves 3", so that the limbs 4' are engaged in the grooves 3" during rotation of the cap parts 1 and 2. The bridge part 4 has projecting members 6 provided on both sides having sloping surfaces 6' rising in the direction of closing, which project into a hollow rib 1" formed in cap part 1. The hollow rib 1' also acts as a conventional grip member. When rotating the upper cap part 1/1'/1" in a clockwise direction, the lower threaded cap part 2 is rotated therewith by means of the bridge part 4 via the projecting members 6 until it has been tightened on a container or socket thread with predetermined tightening torque, whereupon the cap part 1 rides over the sloping surfaces 6' forcing down the compression spring 5 and disengaging the bridge part 4 with the hollow rib 1", whereby both cap parts 1/2 are mutually disengaged, so that the threaded cap part 2 cannot be tightened any further. For opening or removing the cap by turning in an anti-clockwise direction, the threaded cap part 2 is again rotatably engaged therewith, since vertical stop surfaces 6" on the other side of the projecting members 6 on the coupling bridge 4 act as engaging members and come into engagement with hollow rib 1", and the cap is readily rotatable.

For holding the compression spring 5 between bridge part 4 and the lower threaded cap part 2 the closure 3' has an indentation 7, therein, whereby a lateral guide 7' of the spring 5 is obtained. Either a cylindrical or conical spring may be used, the latter giving a greater spring characteristic over a smaller space.

A mandrel 8 projecting downwards from the bridge part 4 may also engage in the compression spring 5 from above for the retention of said spring. Also, the compression spring 5 may be retained within a recessed hollow 9.

FIG. 1 shows means for mounting or lateral guidance of a compression spring 5 and bridge part 4 inserted between cap parts 1/2 for optional gauging of the required cap tightening torque in an overall combination, which means optionally may also be employed individually or in partial combination.

A sealing member 10 is mounted below the edge 2' of the flange relative to the container or pipe socket to be closed, not shown.

The invention is not limited to one embodiment of the drawing, moreover in modification the lower cap part 2,2', 2" may be made of plastics material, whereby then the lower threaded part of the cap part 2 may be made solid, and provided with recesses for the bridge part 4,4' and with groove guides 3".

What is claimed is:

1. A screw cap for containers, comprising a cap part and a threaded part, said cap part being mounted on and rotatable with respect to said threaded part, said cap part having a pressed-out hand grip arranged thereacross, means for coupling together said cap part and said threaded part comprising a bridge part, bearing limbs provided on said bridge part and spring means biasing said bridge part, said threaded part including grooves therein for guiding said bearing limbs, said spring means being located between said bridge part and said threaded part and urging said bridge part against said cap part and acting in such a manner that, on reaching a predetermined tightening torque of said threaded part in a thread, automatic decoupling of said parts occurs thereby preventing excessive tightening of said threaded part.

2. A screw cap according to claim 1, wherein said threaded part is formed with a retroverted cup extending thereinto, said guide grooves being formed in said cup for the mounting of said bridge part.

3. A screw cap according to claim 1, wherein said threaded part has a recess therein for the location and lateral guidance of said compression spring.

4. A screw cap according to claim 1, wherein said bridge part has a mandrel-like part projecting downwardly therefrom, which engages within said spring means for the retention thereof.

5. A screw cap according to claim 1, wherein said bridge part has a hollow recessed in the underside thereof, said spring means being extended upwards to within said hollow.